United States Patent
Lecomte

(10) Patent No.: US 7,221,802 B2
(45) Date of Patent: May 22, 2007

(54) METHOD AND DEVICE FOR SECURE TRANSMISSION OF JPEG ENCODED IMAGES

(75) Inventor: Daniel Lecomte, Paris (FR)

(73) Assignee: Medialive (FR)

( * ) Notice: Subject to any disclaimer, the term of this patent is extended or adjusted under 35 U.S.C. 154(b) by 0 days.

(21) Appl. No.: 11/166,424

(22) Filed: Jun. 24, 2005

(65) Prior Publication Data

US 2005/0281471 A1    Dec. 22, 2005

Related U.S. Application Data

(63) Continuation of application No. pct/fr03/050194, filed on Dec. 19, 2003.

(30) Foreign Application Priority Data

Dec. 31, 2002  (FR) .................................. 02 16919

(51) Int. Cl.
*G06K 9/36* (2006.01)
*H04N 7/18* (2006.01)

(52) U.S. Cl. ...................... 382/232; 382/233; 348/143; 348/15

(58) Field of Classification Search ................ 382/233, 382/278, 232, 103, 154; 348/143, 155; 370/238, 370/401, 465, 466, 536; 386/69, 70; 725/32; 709/206; 375/222, 240.08
See application file for complete search history.

(56) References Cited

U.S. PATENT DOCUMENTS 6,970,183 B1 * 11/2005 Monroe ...................... 348/143

FOREIGN PATENT DOCUMENTS

| EP | 0 633 703 A2 | 1/1995 |
|---|---|---|
| EP | 0 920 209 A1 | 6/1999 |
| EP | 1 011 269 A1 | 6/2000 |
| WO | WO 00/31964 | 6/2000 |

OTHER PUBLICATIONS

Wenjun Zeng et al., "Efficient Frequency Domain Video Scrambling for Content Access Control", ACM Multimedia, Proceedings of the International Conference, New York, NY, US, Oct. 30, 1999, pp. 285-294.

* cited by examiner

*Primary Examiner*—Anh Hong Do
(74) *Attorney, Agent, or Firm*—DLA Piper US LLP

(57) ABSTRACT

A process for distributing digital still images according to a nominal format, where each image is broken into blocks and macroblocks that depend upon each other by correlation coefficients including analyzing contents of the still images to generate two parts: a) a primary contents in nominal format corresponding to the image as modified by substitution of certain correlation coefficients with coefficients that are of the same type, but which are random, and b) additional digital nature of any format, which includes substituted correlation coefficients and digital data that are likely to allow reconstruction of the modified image; transmitting separately the modified primary contents in real or deferred time and additional digital information in real time at a moment of viewing from a server towards recipient equipment; and calculating a synthesis of contents of the recipient equipment that is in nominal format as a function of the modified primary contents and the additional data.

7 Claims, 3 Drawing Sheets

METHOD AND DEVICE FOR SECURE TRANSMISSION OF JPEG ENCODED IMAGES

RELATED APPLICATION

This is a continuation of International Application No. PCT/FR2003/050194, with an international filing date of Dec. 19, 2003 (WO 2004/062292 A1, published Jul. 22, 2004), which is based on French Patent Application No. 02/16919, filed Dec. 31, 2002.

FIELD OF THE INVENTION

This invention involves the processing, broadcast, recording and secure viewing of digital still images, or, more generally, any file that uses a nominal format of the JPEG type, by authorized users, and provides a secure system for the handling, broadcast, delivery, recording, private copying and viewing of visual contents.

BACKGROUND

It has been a problem to provide a device that is able to transmit, in a secure manner, a set of high-quality visual still images in a JPEG-type format directly to a display device and/or to be recorded on the hard disk of a unit connecting the teletransmission network to the display device, while at the same time preserving visual quality, but avoiding any fraudulent utilization such as the possibility of making illegal copies of still images recorded on the hard disk of the set top box.

Using currently available solutions, it is possible to transmit still images in digital format using broadcast networks of the Hertzian, cable, satellite or other types, or through DSL (Digital Subscriber Line) or BLR (local radio loop) type telecommunication networks. Moreover, to avoid hacking of copyrighted work distributed in this way, the latter are often encrypted using various known methods.

EP 0 920 209 discloses a video scrambling process in the MPEG-2 format, where the video data consists of at least one block of at least one image encoded in the Intra (I) mode and consisting of data (AC, DC) that has been selected using a discreet cosine transform (DCT) and which, for each block, consists of a primary DC coefficient that features the average intensity of the pixels in the block and AC coefficients representing variations in intensity between pixels in the block. Video scrambling is conducted using an internal permutation step in at least one block, according to a permutation row (R), and where coefficients AC represent the variations in intensity between the pixels in the block. That requirement can be applied to JPEG-type images whose structure is similar to that of images in Intra-mode of an MPEG-2 data stream. The AC coefficients and the R-row permutation function applied to them also involve the DC coefficients after they have been recalculated using a C command. That system is a standard encryption solution and allows only scrambling and unscrambling of an MPEG-2 data stream without a security procedure for the broadcast of its data for reconstruction of the original data stream. In particular, all the data used to reconstruct the data stream (row R and DC coefficients encrypted using a key), as well as all the data constituting the original data stream, are comprised in the MPEG-2 data stream and are sent together and through the same route, where the protected MPEG-2 data stream containing the data for the reconstruction is the sole output data for the scrambling process. Consequently, EP '209 does not meet the high-security criteria.

EP 1 011 269 discloses a system for processing a data signal that consists of a system for scrambling the data signal and at least one unscrambling system for the scrambled data signal. The scrambling system comprises means for analyzing the entropic distribution of the data signal, means for scrambling a data signal as a function of its entropic distribution to form a scrambled data signal that has the same entropic distribution as the clear data signal, and means for compressing the scrambled data signal. The unscrambling system consists of means for decompressing the scrambled signal and means for unscrambling the scrambled signal to form the clear data signal. EP '269 also discloses a secure distribution system of a signal in which unscrambling the data stream requires the scrambled data stream and an additional piece of data to unscramble the data stream. Nevertheless, the additional information is stored and encrypted on the hard disk belonging to the user who wishes to utilize the signal. An ill-intentioned user who has an appropriate software means can decrypt the additional information and use the clear data signal without the consent of the owner of this signal. That system is founded solely on the entropic distribution of the signal to scramble it, and scrambling is carried out before compression and quantification. EP '269 describes how to limit the deterioration involved in the process with an equalization applied to minimize losses. However, this process is not without losses and does not guarantee the absence of deterioration. Finally, the process represents a standard encrypting and scrambling solution, where all the initial information is present in the protected data stream. Consequently, the goal of preserving the high visual quality of a process without losses and ensuring high security of the visual contents and the data allowing their reconstruction is not achieved.

SUMMARY OF THE INVENTION

This invention relates to a process for distributing digital still images according to a nominal format, where each image is broken into blocks and macroblocks that depend upon each other by correlation coefficients including analyzing contents of the still images to generate two parts: a) a primary contents in nominal format corresponding to the image as modified by substitution of certain correlation coefficients with coefficients that are of the same type, but which are random, and b) additional digital nature of any format, which includes substituted correlation coefficients and digital data that are likely to allow reconstruction of the modified image, transmitting separately the modified primary contents in real or deferred time and additional digital information in real time at a moment of viewing from a server towards recipient equipment, and calculating a synthesis of contents of the recipient equipment that is in nominal format as a function of the modified primary contents and the additional data.

This invention also relates to an apparatus for fabricating digital still images according to the process for distributing digital still images according to a nominal format, including at least one multimedia server containing original still images and a device for analyzing each image emanating from the server to generate the two parts.

This invention further relates to a device that uses still images according to the process for distributing digital still images according to a nominal format, including a standard image decoder, at least one recording interface designed to store the modified primary contents, at least one display interface, and a means for restoring the original image using the two parts.

This invention still further relates to a system for transmitting digital still images including a device including a apparatus for fabricating digital still images according to the process for distributing digital still images, including at least one multimedia server containing original still images and a device for analyzing each image emanating from the server to generate the two parts, at least one device including a standard image decoder, at least one recording interface designed to store the modified primary contents, at least one display interface, and a means for restoring the original image using the two parts, and at least one communications network between the fabricating device and the user device (s).

BRIEF DESCRIPTION OF THE DRAWINGS

This invention will be better understood upon reading of the description of the following non-limiting example of selected aspects of the invention, which refers to the attached drawings in which.

DETAILED DESCRIPTION

Figure 1:
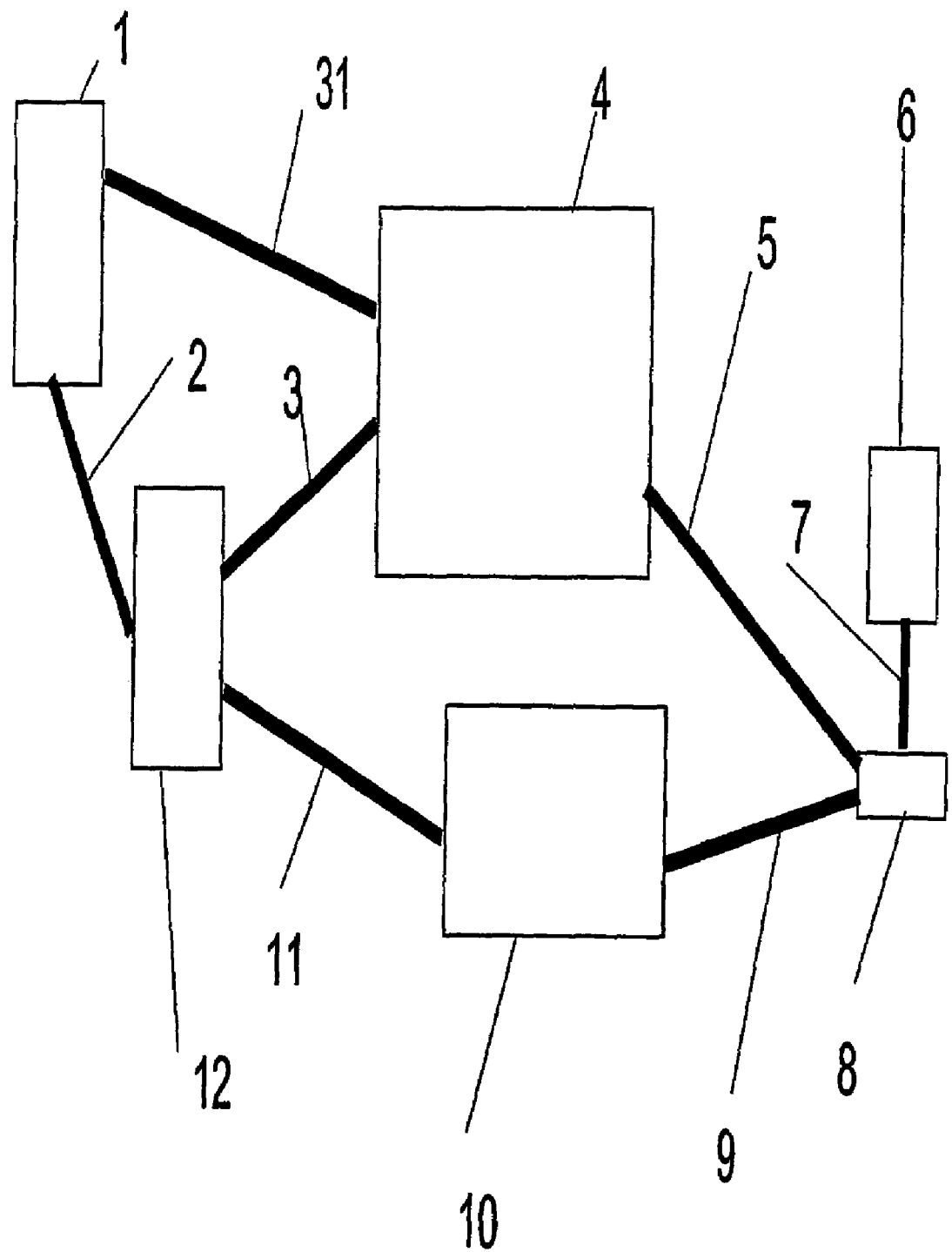
FIG. 1 schematically shows the device architecture for a system for the implementation of the process according to aspects of the invention.

This invention involves a process for distributing digital still images according to a nominal format, where each image is broken into blocks and macroblocks that are dependent upon each other through correlation coefficients, and, before transmission to the client's equipment, an analysis of the contents to generate a primary content in the nominal format corresponding to the still image that has been modified by substitution of certain correlation coefficients with coefficients of the same nature, but which are random, and additional digital data of any format, comprising the substituted correlation coefficients and the digital data that are likely to permit reconstruction of the modified image, then of separately transmitting the principal modified contents in real or deferred time and the additional digital data in real time at the moment of viewing from the server to the receiving equipment, and by the fact that on the receiving equipment a synthesis of contents is calculated, in nominal format as a function of the modified primary contents and the additional data.

According to a preferred aspect, the nominal format is defined by the JPEG standard.

Favorably, the synthesis produces an image that is rigorously identical to the original image, i.e., the process experiences no losses.

Favorably, the analysis determines the correlation coefficients that are to be modified to obtain the primary contents that have been modified by the transposition of the two correlation coefficients or by the replacement of the correlation coefficients with a still image by random values.

Preferably, the synthesis is authorized for a consultation of a private copy requested by the client.

In a particular implementation of this process, transmission of the primary modified contents is carried out through an equipment support that is distributed physically as a CD-ROM, a DVD, a hard disk or a flash-type memory board, for example.

In another aspect, transmission of the modified principal contents is carried out through a broad band network such as cable, satellite, fiber optic, Hertzian, DSL, DAB or the like.

The transmission of the additional information is conducted through a cable network, a commuted telephone network (analog or digital CTN, for example), a mobile telephone network that uses GSM, GPRS or UMTS standards, for example, through a BLR (Local Radio Loop) or a DSL-type network.

Transmission of the additional data may be conducted through a broadband network of the same type as the network used by the primary contents, namely, through the same network. Also, transmission of the additional data may be conducted using a flash-type memory board or using a chip card.

The two generated parts (modified primary contents and additional data) can be directed towards a single device, a group of devices or all devices.

Reconstruction can likewise be authorized for consultation of a private copy of the still image requested by the client. The fact that the reconstruction is conditional upon the authorization of the portal allows any service operator to manage all the rights connected to the still images and visual works.

The invention also includes a device for manufacturing visual contents for the purpose of implementing the procedure described previously, comprising at least one multimedia server containing the original images and distinguished by the fact that it comprises an analytical device for the image originating from the server to generate the two parts.

Advantageously, this device comprises a memory for recording a "private copy" marker indicating, for each still image, the rights of each user: a private copy that can be looked at an unlimited number of times, a private copy that can be looked at a limited number of times and what number of times, a prohibited private copy.

Moreover, the invention relates to a device for the use of visual contents for the purpose of implementing the previously described process, which comprises a standard contents decoder, at least one recording interface (hard disk or non-volatile memory) designed to store the modified primary contents and at least one display interface distinguished by the fact that it comprises means for re-keying the original image using the two parts.

The means may be a software application installed in the device. Also, the means may be a fixed electronic device. Further, the means may be a portable (mobile) electronic device with its incorporated screen.

According to another aspect where the equipment is installed on a computer, the means uses a resource that is specific to a product (board) to avoid copying the temporary data of the additional data on a permanent support.

Favorably, the recording interface also stores a "private copy" marker in relation to the modified primary contents indicating the user rights for this image: private copy that can be looked at an unlimited number of times, private copy that can be looked at a limited number of times and what number of times, prohibited private copy.

The device may comprise a chip card reader that allows the user to be identified. The device may also comprise a chip card reader, where the chip card contains the software applications.

The equipment comprises a chip card reader, where the chip card contains the data in the additional information for given contents.

Finally, the invention includes a system for transmitting a digital image comprising a digital image production device, at least one digital image user device and at least one communication network between the production device and the user device(s).

The invention also includes a set of data in nominal format, specifically but not exclusively a JPEG-type file. The file format used must have the following characteristics:

the image corresponding to the file is broken into macroblocks of a selected size, where the macroblocks are themselves broken into a selected size; and the image contains correlation coefficients between the various blocks and/or macroblocks.

In the following description, an example describes a JPEG image. However, this is merely representative and in no way constitutes a limitation of the scope of the invention as defined in the appended claims.

The general principal of a security process for transmission of still images is set forth hereinafter. It is helpful to authorize the still image viewing services upon request and on the board through all the distribution and local recording networks in the user's digital decoding unit. The solution comprises permanently preserving, outside of the user's habitation, in fact in the distribution and transmission network, a part of the recorded visual contents, where this part is primordial to visualizing the contents on a display device like a monitor or a television screen, but which is of a very low volume relative to a total volume of digital visual contents recorded by the user. The missing part will be transmitted through the transmission distribution network at the time the digital visual contents, pre-recorded by the user, are viewed.

The greater part of the visual contents will therefore be transmitted through a standard distribution network whereas the missing part will be sent upon request through a narrowband telecommunications network such as the standard telephone network or cellular networks of the GSM, GPRS or UMTS types or by using a small part of a network of the DSL or BLR type, or even by using a sub-assembly of the bandwidth shared by a cable network.

Turning now to the Drawings, FIG. 1 shows the interface arrangement (8) adapted to connect to at least one display device, for example, a monitor, a video projector or a television screen-type device (6), to at least one network interface for broadband transmission and distribution (4) and at least one telecommunications network interface (10). This arrangement comprises a module (8) that comprises primarily, on the one hand, a processing unit that is adapted to process, specifically decode and unscramble any JPEG-type image according to a pre-loaded software decoding and unscrambling program, to display, store, record and/or send it to a telecommunications network and, on the other hand, at least one screen interface (7) and a connection interface to a local or extended network (5) and/or (9). The broadband transmission and broadcast network (4) and the telecommunications network (10) can be combined into a single network.

The hard disk in module (8) can be used as a temporary plug to momentarily store at least one part of the visual contents to be displayed, in the case of deferred viewing or limitation in the bandwidth of the transmission network. Viewing can be delayed or deferred upon request of the user or the portal (12).

The connection interface (5) is connected to a broadband transmission and broadcast network (4) such as a modem, satellite modem, cable modem, fiber optic line interface or a radio or infrared interface for wireless communication.

It is through this standard broadcast connection that the visual contents such as images are transmitted. Nevertheless, provision is made to preserve a small part of the visual contents in portal (12) to prevent pirated copies from being made before transmitting the visual contents from the server (1) or the portal (12).

In the case of viewing visual contents, this small part of the visual contents that has been preserved in portal (12) will likewise be sent to module (8) through telecommunications network (10), without the user being able to permanently record on a support medium connected to module (8).

A JPEG image is therefore modified, while preserving the additional data allowing reconstruction of the image in portal (12). This additional data is determined by encoding the image.

The first operation of a JPEG-type encoding is cutting the image into blocks of 8 pixels by 8 pixels for JPEG. Each block therefore constitutes a set of whole values, where each value is encoded over a certain number of bits. In the case of a JPEG image in gray levels, we have 64 encoded values, each by 8 bits, or 256 possible values for each block. The values range from 0 (black) to 255 (white).

The second step in the JPEG compression is the passage into the frequential domain. The block, composed of luminous intensity values, is transformed into a block of the same size containing the special frequencies attached to these intensities. In the case of JPEG, the intensities are shifted beforehand so that they are centered about 0. The new scale of intensities therefore ranges from −128 to +127. Moreover, the transformation carried out is a discrete cosine transformation ("DCT") which organizes the frequencies in the block such that the low-frequency components are located in the upper left of the block. The first upper left component is therefore the continuous component of the block ("DC coefficient").

Since the DC coefficients of adjacent blocks are often close values, the difference between the DC coefficient of the processed block and the final DC coefficient of the same encoded type is encoded to reduce the size taken up by the code data stream.

The third step is quantification of the frequency values obtained by transformation to reduce the data that needs to be transmitted. This quantification is adapted to the human visual system. To do this, a quantification matrix is defined that is of the same size as the frequency block. Each coefficient is quantified as a function of the corresponding value in the quantification matrix. In this way, if the value of the coefficient is 200 and the corresponding quantification step is 50, the quantified value will be 4 (or 200 divided by 50). Since the human eye is less sensitive to data losses in the high frequencies, the quantification steps increase with frequency. This implies, in particular, that if the step is significant for the high frequencies, many of the located quantified coefficients will be equal to 0.

We use this property for encoding the quantified coefficients of each block, by encoding a block like a succession of coefficients ordered in zigzag starting from the upper left corner. The end of the sequence for this block therefore consists of numerous consecutive zeros, which allows encoding to be optimized.

Moreover, variable-length coding (VLC) is a technique for statistical encoding that allocates the code words to the values to be encoded. Short code words are allocated to the elevated occurrence frequency values, and long code words to those of lesser frequency of occurrence. On average, the more frequent short code words are in the majority, such that the encoded chain is shorter than the original data. This type of encoding is also called "entropic encoding" or "Huffman encoding".

In the case of a color image, the representation of the colors in each pixel consists of three components: a luminance component Y and two chrominance components, Cb and Cr.

The human visual system (HVS) is more sensitive to resolution of the luminance component of an image, and the Y pixel values are encoded at full resolution. The human visual system is less sensitive to chrominance data. Sub-sampling eliminates the pixel values based systematically on position, which reduces the quantity of data to be compressed using other techniques. The standard preserves a set of chrominance pixels for each 2×2 neighborhood of luminance pixels.

Due to this fact, for a color image, the base encoding unit for an image is the macroblock. Macroblocks for the still image are encoded successively, from left to right, and from top to bottom. Each macroblock is composed of 6 8×8 blocks: four blocks of luminance Y, one block of chrominance Cb and one block of chrominance Cr. It should be noted that the four luminance blocks cover the same area of the image as each of the chrominance blocks, due to the sub-sampling of the chrominance data, carried out to adapt encoding to the sensitivity of the human visual system.

The invention consists of using the correlation between the DC coefficients in an image to allow manipulation of the appearance of the image in question. In this way, the possibility of obtaining significant deterioration of a still image of the JPEG type without carrying out complicated manipulations is offered by the correlation between the DC coefficients in this image. In effect, as the coefficient of a given block is encoded by the difference relative to the value of the last encoded coefficient, modifying the first coefficient implies modifications over all the values of the DC coefficients dependent upon it. This is how, by modifying the data contained in it, the image is greatly modified.

In the case of a color image, each macroblock in an image contains six blocks, where each block starts with a DC coefficient. Four blocks corresponding to the luminance (Y), and two to the chrominance (C) of the macroblock. The value described in a file that encodes the JPEG image, which represents a DC coefficient, is in effect the difference between the real value of this coefficient and that of the corresponding coefficient which precedes it and which, for the Y-blocks, can be found in the same macroblock or in the preceding macroblock, whereas for the C blocks, it is always found in the preceding macroblock. One modification to one of these differences will automatically cause a change in the data in all the macroblocks which follow it.

This method is an optimal one for the visual deterioration of the JPEG image by using the block's DC coefficients, but it can also be applied to the AC coefficients. Modification can thus also be considered for some of these AC coefficients, in a random manner, to transmit in the additional data, which coefficients have been modified and what is their real value, and to reconstruct the original image using this data. The next step is developed using the DC coefficients, but it is understood that all the next steps are applicable to the AC coefficients.

When it reads the binary train of a still image, a standard JPEG decoder identifies the beginning of the encoded image. To avoid any confusion between a standard decoder unit, which is often called a "Set Top Box or STB", the standard JPEG decoder shall be called a "Player" or "Viewer" in the remainder of this document. This Player can be hardware and/or software. The JPEG player successively decodes each macroblock in the image. The image is reconstructed when all its macroblocks have been processed.

In the case of a JPEG-type image, all the characteristics of the image originating from server (1) or portal (12) are not transmitted towards module (8). In particular, the characteristics in accordance with aspects of the invention are the DC correlation coefficients contained in the image.

Certain DC coefficients of the image are preserved in portal (12). On the other hand, in the stead and place of the DC coefficients of the untransmitted image, the device inserts false DC coefficients of the same type as the DC coefficients that were removed and preserved in portal (12) such that the standard JPEG player in module (8) is not disturbed by these modifications, which it ignores, and reconstructs at its output a JPEG output image which is incorrect from the visual point of view of a human being, but which is correct from the JPEG format point of view.

The unit's JPEG player (8) is a standard JPEG player and is not in any way modified or affected by the changes made to the processed image.

Subsequently, secure transmission of a single JPEG-type image is described. The file containing the code that corresponds to this image is called "visual content." The process likewise applies to a visual content that corresponds to multiple images as this is the case with the standard MJPEG ("Moving JPEG") which is a succession of still images of the JPEG type.

As is shown in FIG. 1, the connection interface (9) connects to an extended telecommunications network (10), directly or through a local network that serves the access network and consists for example of a subscriber line interface (Analog or digital telephone network, DSL, BLR, GSM, GPRS, UMTS or the like).

The visual contents are transmitted in the standard manner through the broadband transmission network (4) of the Hertzian, cable, satellite, digital Hertzian, DSL type from server (1) directly through the connection (3a) or through portal (12) through connection (2) and (3) towards the decoder module (8) through connection (5). Each piece of visual contents broadcast in this way can be either encrypted or not, and the JPEG-type image comprises modifications as described above. As a function of the parameters chosen by the user or of data transmitted by the broadcast server, certain visual contents modified in this way and which are incomplete are recorded on the unit (8)'s hard disk.

When the user wishes to view an image recorded on the hard disk of its unit (8), it makes the request in the standard manner using a remote control connected to its unit (8) which is then connected automatically to portal (12) through connection (9) of the local network or direct access type and through the telecommunications network (10) which is itself connected to portal (12) through connection (11). During the time the image is being viewed, connections (9) and (11) remain established and allow unit (8) to receive functions and parameters for putting the modified DC image coefficients back in order. The modified DC image coefficients transmitted are not recorded in unit (8)'s memory because the reconstructed image is directly displayed on the viewing screen (6) through connection (7) after they have been processed by unit (8)'s player through its volatile local memory. Once they have been processed and viewed, the modified and/or missing DC coefficients of the image that were just transmitted through portal (12) are erased from the local volatile memory of unit (8).

Each time the user wants to look at visual contents that have been recorded on unit (8)'s hard disk, unit (8) will automatically connect itself to portal (12).

Unit (8) may comprise a chip card reader which allows portal (12) to authenticate unit (8)'s proprietary user. For a given JPEG content, the chip card may contain the additional data which was recorded by portal (12).

If it has been authorized, the chip card likewise allows the user to produce private copies of visual contents recorded on the hard disk of its decoder unit (8). To do this, if the user wants to make a private copy of visual contents, the user will do so in the standard manner on a storage device through connection (7) which connects unit (8) to viewing screen (6).

Nevertheless, if the user wishes to preserve a private copy on its unit's hard disk, the user indicates this to unit (8) which records the "private copy" information as well as the user coordinates found on the chip card, in a specific field (84) of the visual contents recorded on the hard disk (85) of the decoder unit (8). Subsequently, each time the user wants to view this private copy, unit (8) will automatically connect to portal (12) and indicate that the user wishes to read the private copy. In return, if reading the private copy is possible for the user, who possesses the chip card connected to unit (8), the decoder unit (8) then receives the DC coefficients that are either modified and/or missing as well as all the other data that allows viewing of the still image that constitutes the private copy.

The copy known as the "private" copy can allow the user to look at the same visual contents in an unlimited manner or a number of times determined in advance by the service offerer who has authorized this private copy.

The invention likewise involves the physical unit (8) used by the consumer to access data. This physical unit is located in the home of the user. It provides a set of functions which manages the appropriate data to be presented according to the audience's selection and manages the connection and communication with the remote server.

The physical unit (8) corresponding to the interface arrangement may be implemented as a fixed autonomous device with local memory device, such as, for example, an integrated hard disk.

The physical unit corresponding to the interface arrangement (8) may be implemented as a portable autonomous (mobile) device with integrated hard disk and/or disk player (CD, DVD, etc.).

The autonomous physical unit (8) may comprise a chip card reader. The interface arrangement (8) may be implemented as an additional card which can be installed in a PC-type computer and will be connected to at least one network transmission and broadband broadcast interface (4) and at least one telecommunications network interface (10). This card can use the PC computer's hard disk to recording the primary contents, but includes its own calculator and volatile memory to not allow the ill-intentioned PC user a means of accessing additional data such as modified still-image DC coefficients.

Multimedia servers (1) and/or (12) comprise means for encoding, transcoding and scrambling of visual data, in particular, means for adding cryptographic and security data of visual contents.

Finally, it should be noted that the invention degrades the JPEG image from the visual point of view until it no longer allows recognition of the objects represented and displayed without having access to the data and additional characteristics, but totally reconstructs the JPEG image in the interfacing arrangement (8) without any losses.

Figure 2:
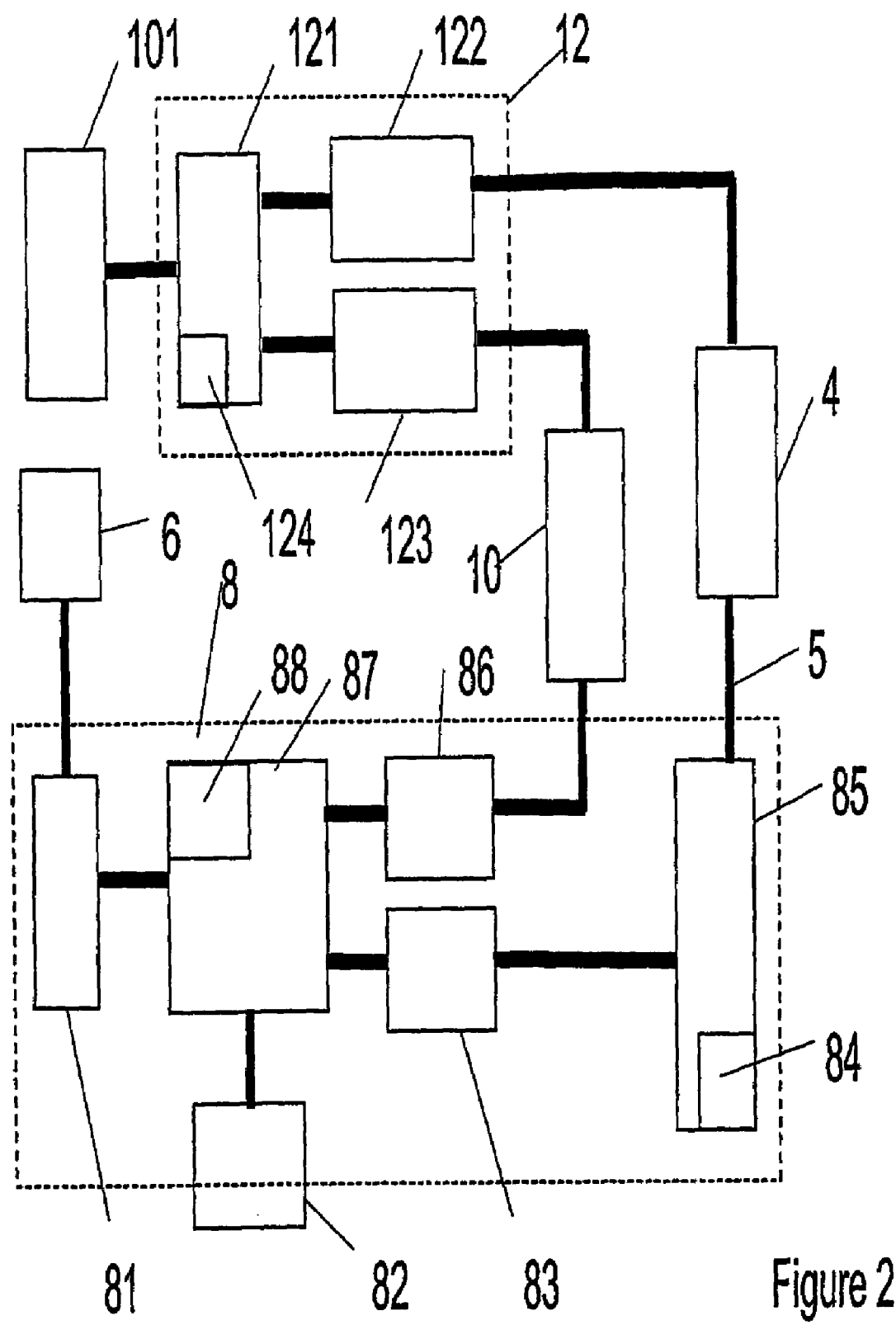
FIG. 2 shows a specific manner of embodiment of the analysis and synthesis system of the JPEG-type contents in accordance with aspects of the invention.

The invention will also be better understood through the following description by referring to FIG. 2 of the attached Drawings that shows an aspect of the invention that is particularly well adapted for cable and satellite networks. The complete JPEG image (101) is analyzed by the analyzing device (121) in portal (12) and is thus separated into two parts. A first part ("primary contents") is a JPEG-type image, but whose missing DC coefficients have been processed and which has been sent through the portal's output (122) towards the broadband transmission broadcast network (4).

The other part of the modified JPEG contents ("additional information") is recorded in the memory plug (123) in portal (12). For each JPEG contents broadcast in this way, portal (12) preserves, in a memory plug (123), the changes that were made to this JPEG contents by analyzer (121) in portal (12). It is specified here that, for the same JPEG input contents (101) the contents can be handled differently for each user (8) and/or for each group of users (8). In this way, memory plug (123) in portal (12) comprises a different memory zone for each user.

In the examples given, for a primary user, a JPEG-type image is modified; in the second example, device (8) is portable (mobile).

The different stages for this primary user are now described in detail.

Portal (121) has selected the JPEG contents (101) that it will have to send to user (8) to be looked at on its viewing screen (6). This user is connected to a digital broadcast cable network (4) and to an ADSL telecommunications network (10).

The analysis system (121) in portal (12) therefore reads the entering JPEG (101) contents, under the circumstances, an image, and it decomposes it into macroblocks (and also into slices), then into blocks. This analysis allows it to recognize the DC coefficients in the code, and to substitute some of them with random values to make the image illegible from the human visual point of view. The true values of the DC coefficients are stored in the output area (123), which later allow reconstruction of the start image in unit (8), by following the inverse route. In the example shown, one macroblock out of two consists of a modified block (DC coefficient), while at the same time respecting the equality of modification frequencies for the six blocks in a macroblock.

The new modified JPEG contents are then recorded in the output area (122) to be distributed over the broadcast network (4) through connection (3). The DC coefficients substituted in the JPEG image are recorded in plug (123) in portal (12).

During this time, and in a manner that is completely unsynchronized, the modified JPEG output contents emanating from the output area (122) in portal (12) is broadcast through the broadband network (4) towards one or more users (8).

Each authorized decoder unit (8) that wants to record this JPEG content that is modified in this way, can thus read this JPEG content and record it in its local memory (85) such as, for example, its hard disk. This recording initiative is left to decoder (8) under the control of portal (12). To do this, the analysis system (121) had inscribed, in the JPEG contents, some additional data information that pinpoints the recipients of these modified JPEG contents. The recipients can thus be a specific recipient (8) and it alone, a group of recipients (8) or a set of decoders (8) that are connected to network (4).

The phase described above corresponds to the first preparation phase of the JPEG contents by portal (12), to its transmission through broadband network (4) and its recording in a decoder (8). This decoder can then display this JPEG contents that has been recorded in its memory or on its hard disk (85). To do this, the synthesis system (87) of decoder (8) reads the JPEG from its memory (85) and sends it to a standard JPEG player (81). If no additional data is received by the synthesis system (87), then the JPEG content that reaches player (81) is processed and displayed as it is, which causes a significant distortion of the image displayed on viewing screen (6). In effect, the modified image, which is processed by synthesis system (87), does not correspond to the original image, because some DC correlation coefficients have been substituted for by random coefficients. In compensation, as the recorded contents are indeed a JPEG-type content, where player (81) makes no difference and displays the data on output screen (6) which appear in fact as JPEG image data, but which are completely incoherent to the human being looking at screen (6). Every copy of the JPEG content emanating from hard disk (85) in unit (8) produces the same visual effect during its restoration by any JPEG reader. Any use of this copy that may be ill-intentioned is therefore destined to failure.

When the user of decoder (8) actually wants to view, on screen (6), the visual contents recorded in its memory or on hard disk (85), the user makes a request for this to synthesis system (87). Synthesis system (87) then makes a request to memory (85) and begins to analyze the modified JPEG contents emanating from memory (85) through playing area (83). Synthesis system (87) then establishes a connection with portal (12) through the telecommunications network (10) which is, in the example, a DSL link. Once this link has been established, synthesis system (87) brings from memory plug (123) in server (12) the substituted correlation coefficients and the data corresponding to the modified image of the contents recorded in memory (85). These correlation coefficients and position data reach synthesis system (87) through the input memory area (86) and are stored temporarily in the volatile memory (88) in synthesis system (87). Starting with the modified JPEG contents that arrive via plug (83) and starting from correlation coefficients and associated data that arrive via plug (86) to memory (88), synthesis system (87) reconstructs, in a manner that is inverse of the previously described analysis process, the image modified by the real image and sends the new JPEG image reconstructed in this manner to reader (81) so that it is displayed correctly on screen (6). The correlation coefficients to be substituted and the data associated with this image are used to calculate the image to be displayed on screen (6). Once this data has been used and the image is displayed on screen (6), they are erased from volatile memory (88).

In the example undertaken, before portal (12) authorizes sending the image and associated data from its plug (123), portal (12) verifies that the user of unit (8) is indeed authorized to do so. To do this, portal (12) reads the data contained in chip card (82) in unit (8) and verifies that this user is indeed authorized to look at this visual content. It is only after this verification that the correlation coefficients and associated data are sent from plug (123) to unit (8) corresponding to this user through network (10).

In the example undertaken, the user has moreover made a private copy of the visual contents. Synthesis system (87) has therefore inscribed, in a part (84) of memory (85) of the additional data as well as the number of chip card (82) and the "private copy" data as data associated with these visual contents. The next time these visual contents are read privately, synthesis system (87) analyzes the associated data and thus informs portal (12) that the user of decoder (8) is reading the private copy. If this function is authorized for user (8) by portal (12), correlation coefficients and associated data will then be sent by portal (12) to plug (86) as described above. In the opposite case, the correlation coefficients and associated data are not sent and the user of decoder (8) is not able to read the reconstructed JPEG contents.

Figure 3:
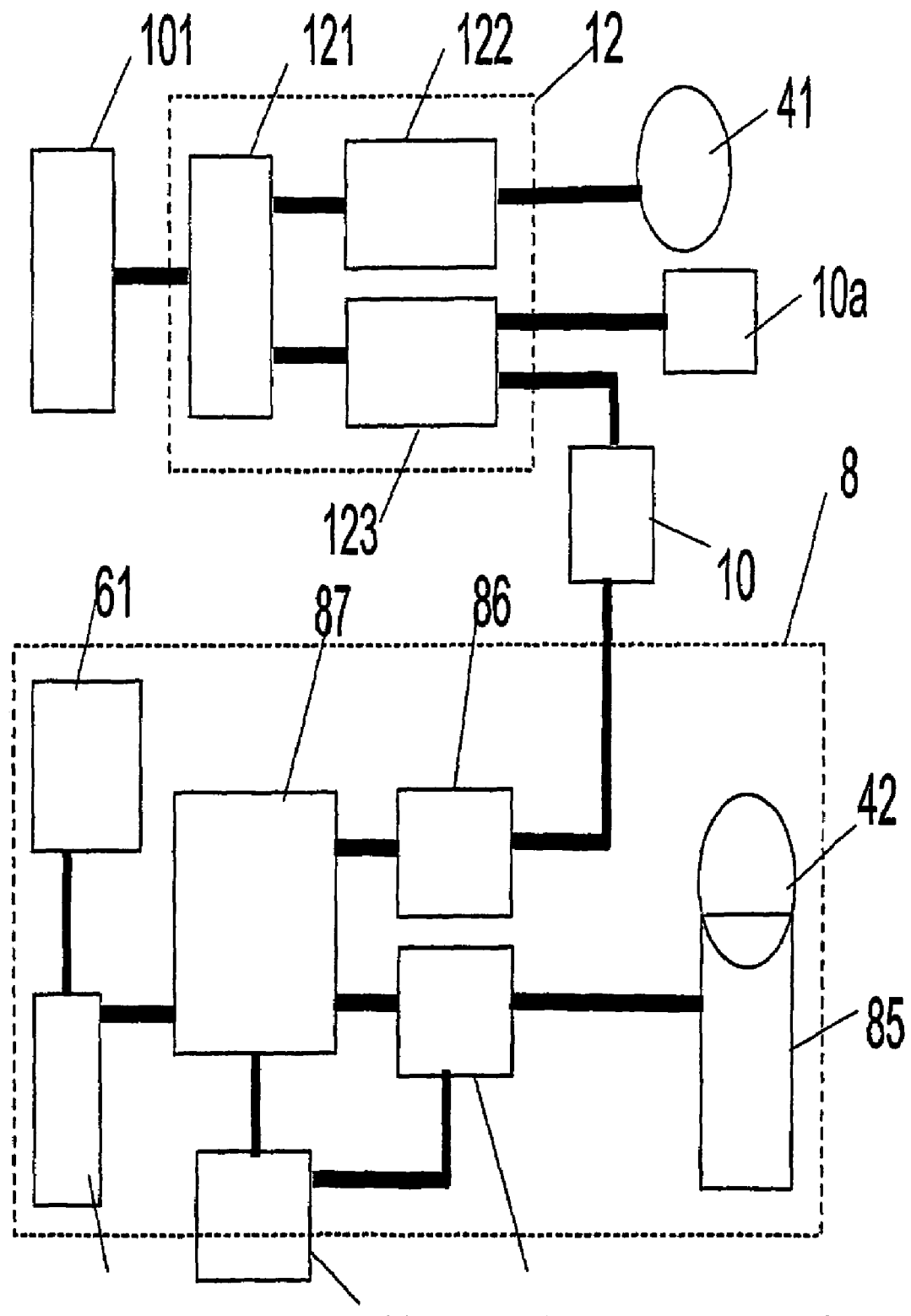
FIG. 3 shows one particular portion of the synthesis system of the contents in accordance with aspects of the invention.

The different stages for the second embodiment shown by FIG. 3 are now described in detail.

The JPEG contents are processed by analysis system (12) in the same way as the JPEG contents as described with respect to the description of FIG. 1. Nevertheless, the primary modified JPEG content is inscribed and recorded on a CD-type physical support (20) from the output memory area in the analysis system (12).

Additional information is recorded in area (123) and likewise recorded once again on a physical support (10*a*) in the form of a credit card, consisting of a chip card and a flash memory. This card (10*a*) is read by a card reader (82) in device (8). Device (8) is an autonomous system that is portable and mobile. Device (8) comprises synthesis system (87), standard JPEG reader (81), two memory areas (86) and (83) as well as disk reader (85). Device (8) moreover comprises an integrated screen (6*a*) of the flat screen type which allows the user to view directly audiovisual programs on autonomous device (8).

To view a JPEG-type visual content, the user of device (8) introduces, into disk reader (85) a disk (20*a*) of type (20) that is identical to that recorded by analysis system (12). This disk (20*a*) thus contains JPEG content of the primary contents type, i.e. with the DC coefficients.

Advantageously, the disk (20*a*) is replaced by a memory card and the disk reader (85) is replaced by a reader of the memory card.

The user of device (8) can therefore view this JPEG content on its screen (6*a*) integrated into its device. Nevertheless, in relation to the substitution of the DC coefficients, the JPEG content will not be correct from the visual point of view. The user introduces chip card (82) into the reader to render the contents visually correct, where memory card (10*a*) contains the additional information with the DC coefficients. The synthesis system therefore reconstructs the correct JPEG contents using the primary contents emanating from disk (20*a*) and the additional information emanating from card (10*a*) connected to reader (82).

In a particular arrangement, chip card (10*a*) likewise contains the applications and algorithms that will be executed by synthesis system (87).

In another particular arrangement, chip card (10*a*) contains data and DC coefficients from multiple images for reconstructing multiple JPEG images. In one specific arrangement, device (8) comprises a cellular connection towards a GSM network (10).

The invention claimed is:

1. A process for distributing digital still images according to a nominal format through a communication network to a display, where each image is broken into blocks and macroblocks that depend upon each other by correlation coefficients comprising:

analyzing contents of the still images to generate two parts: a) a primary contents in nominal format corresponding to an image as modified by substitution of certain correlation coefficients with coefficients that are of the same type, but which are random, and b) additional digital nature of any format, which comprises substituted correlation coefficients and digital data that are likely to allow reconstruction of the modified image;

transmitting separately the modified primary contents in real or deferred time and additional digital information in real time at a time of viewing from a server and through the communication network towards recipient equipment; and restoring the images from contents of the recipient equipment that is in nominal format as a function of the modified primary contents and the additional data as received from the communication network.

2. The process according to claim 1, wherein the nominal format is defined by the JPEG standard.

3. The process according to claim 1, wherein the synthesis produces an image that is identical to the original image.

4. The process according to claim 1, wherein the analysis determines the correlation coefficients to be modified to obtain the principal modified contents through inversion of the two correlation coefficients, or replacement of the correlation coefficients of a still image by random values.

5. The process according to claim 1, wherein the synthesis is authorized for a consultation of a private copy requested by the client.

6. A system for transmitting digital still images comprising:

a device comprising a) at least one multimedia server containing original still images and b) a device for analyzing each image emanating from the server to generate two parts;

at least one device comprising a) a standard image decoder, b) at least one recording interface designed to store modified primary contents, c) at least one display interface, and d) means for restoring the original image using the two parts; and at least one communications network between the fabricating device and the display interface(s).

7. The system according to claim 6, wherein the two parts generated can be employed in a single device, a group of devices or for all devices.

* * * * *